L. W. CONE.
GARDEN IMPLEMENT.
APPLICATION FILED JAN. 2, 1912.
1,037,870.
Patented Sept. 10, 1912.
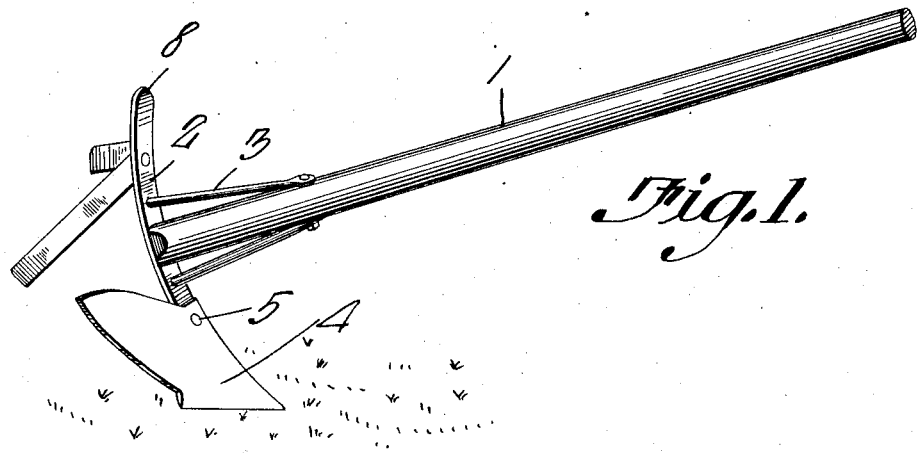
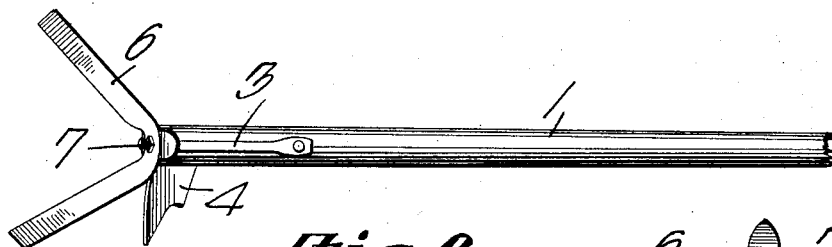
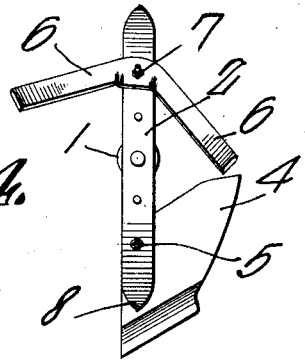
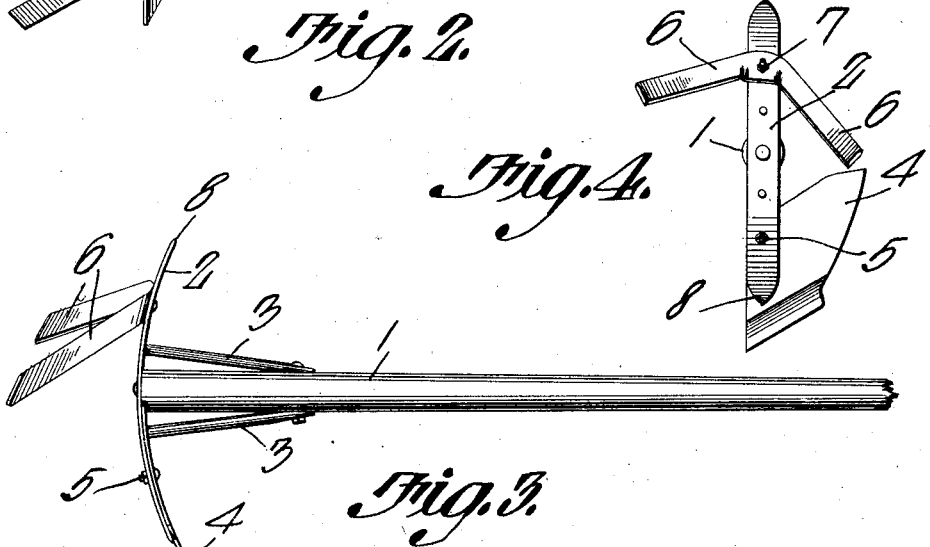
Lewis W. Cone, Inventor
by C. A. Snow & Co., Attorneys
Witnesses

UNITED STATES PATENT OFFICE.

LEWIS W. CONE, OF CROSLAND, GEORGIA.

GARDEN IMPLEMENT.

1,037,870.  Specification of Letters Patent.  Patented Sept. 10, 1912.

Application filed January 2, 1912. Serial No. 669,140.

*To all whom it may concern:*

Be it known that I, LEWIS W. CONE, a citizen of the United States, residing at Crosland, in the county of Colquitt and State of Georgia, have invented a new and useful Garden Implement, of which the following is a specification.

This invention relates to garden implements and one of its objects is to combine, in a single implement, a turning plow, a furrow opener, and a cultivator or scraper.

A further object is to provide a structure of this character which is simple and durable in construction, cheap to manufacture, and which will operate efficiently for all of the purposes intended.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed, without departing from the spirit of the invention.

In the accompanying drawings the preferred form of the invention has been shown.

In said drawings:—Figure 1 is a perspective view of the implement. Fig. 2 is a plan view thereof. Fig. 3 is a side elevation. Fig. 4 is a rear elevation.

Referring to the figures by characters of reference 1 designates a handle of any desired length one end of which is secured upon an arcuate standard 2 preferably formed of heavy sheet metal and braced by means of rods 3 or the like connecting the handle to said standard at points adjacent opposite portions of the handle. A turning plow 4 is connected to one end portion of the standard 2 by means of a removable bolt 5 and detachably connected to the standard adjacent its other end is a scraper made up of a single strip of metal having arms 6 diverging rearwardly from the standard. The middle portion of the scraper is connected to the standard by a removable bolt 7 or the like. Both ends of the standard 2 are preferably pointed, as indicated at 8.

When it is desired to use the implement for breaking the soil, the plow 4 is employed. When the implement is to be used for opening furrows or for marking rows, the plow 4 and the scraper 6 are detached from the standard and either pointed end 8 of said standard can then be used as a furrow opener or row marker. When it is desired to scrape the soil or to cultivate small plants, the scraper 6 is attached to the standard and the end 8 adjacent thereto is brought into engagement with the soil. When the implement is drawn forward the arms of the scraper will shift the loosened soil laterally against the rows of plants between which the implement is used.

What is claimed is:—

A garden implement including an arcuate standard, a handle fixedly connected to an intermediate portion of the standard, and rearwardly diverging soil engaging arms secured to the standard adjacent one end thereof.

In testimony that I claim the foregoing as my own, I have hereto affixed my signature in the presence of two witnesses.

LEWIS W. CONE.

Witnesses:
H. L. JOHNSON,
A. B. HALL.

Copies of this patent may be obtained for five cents each, by addressing the "Commissioner of Patents, Washington, D. C."